US008086435B1

(12) United States Patent
Alexander

(10) Patent No.: US 8,086,435 B1
(45) Date of Patent: Dec. 27, 2011

(54) METHOD FOR PREDICTING SIMULTANEOUS SWITCHING OUTPUT (SSO) NOISE

(75) Inventor: Mark A. Alexander, San Francisco, CA (US)

(73) Assignee: Xilinx, Inc., San Jose, CA (US)

( * ) Notice: Subject to any disclaimer, the term of this patent is extended or adjusted under 35 U.S.C. 154(b) by 430 days.

(21) Appl. No.: 12/333,151

(22) Filed: Dec. 11, 2008

(51) Int. Cl.
G06F 17/50 (2006.01)

(52) U.S. Cl. ............................ 703/14; 716/113; 716/115

(58) Field of Classification Search .............. 703/13–16; 716/106, 110–115
See application file for complete search history.

(56) References Cited

U.S. PATENT DOCUMENTS

| | | | |
|---|---|---|---|
| 6,499,131 B1 * | 12/2002 | Savithri et al. | 716/115 |
| 6,675,365 B2 * | 1/2004 | Elzinga | 716/113 |
| 7,043,670 B2 * | 5/2006 | Alani et al. | 714/47.1 |
| 7,139,691 B1 * | 11/2006 | Duong | 703/19 |
| 7,412,673 B1 * | 8/2008 | Duong | 716/115 |
| 7,428,717 B1 * | 9/2008 | Duong | 716/100 |
| 7,733,118 B2 * | 6/2010 | Hollis et al. | 326/26 |
| 7,788,620 B1 * | 8/2010 | Xue et al. | 716/113 |
| 7,895,555 B1 * | 2/2011 | West et al. | 716/108 |
| 2004/0153850 A1 * | 8/2004 | Schoenborn et al. | 714/43 |

OTHER PUBLICATIONS

Schmitt et al., Simultaneous Switching Noise Analysis for Full-Chip Power Integrity Sign-Off, IEEE 13th Topical Meeting on Electrical Performance of Electronic Packaging, 2004, pp. 107-110.*
Nakamura et al., Handling of Mutual Inductance in Simulation of Simultaneous Switching Noise, Electronic Components and Technology Conference, 1994, pp. 663-668.*
Andresen et al., Simultaneous Switch Noise Modeling for High Performance ASIC, 7th Annual IEEE International ASIC Conference and Exhibit, 1994, pp. 327-330.*
Vaidyanath et al., Influence of Parameter Distribution on Simultaneous Noise (SSN) for CMOS Output Drivers, IEEE 3rd Topical Meeting on Electrical Perfomance and Electronic Packaging, 1994, pp. 33-38.*
Stateye V.4 Product Home by Edotronik Gmbh & Co.KG, May 17, 2007, Service Release Statye V 4.2.3., 2 pages, website http://www.stateye.org/stateyev4.
Stateye V.4.2.3. Documentation, Document release date May 17, 2007, 94 pages, http://www.stateye.org/stateyev4/stateye_documentation.pdf.

* cited by examiner

Primary Examiner — Russell Frejd
(74) Attorney, Agent, or Firm — Michael T. Wallace, Esq.; John J. King

(57) ABSTRACT

A method for the prediction of simultaneous switching output (SSO) noise that may be generated by one or more signal conduction paths within an electrical system. Electrical disturbance waveforms are first recorded for each signal conduction path that may be affected by the electrical disturbances. Next, principles of superposition are utilized to coherently combine each of the electrical disturbance waveforms in the time domain to generate the predicted SSO noise waveform that is imposed upon the affected signal conduction path. The electrical disturbance waveforms may be produced either by using bench measurements performed on an actual integrated circuit, by simulation, or by a combination of simulation and bench measurements.

19 Claims, 6 Drawing Sheets

METHOD FOR PREDICTING SIMULTANEOUS SWITCHING OUTPUT (SSO) NOISE

FIELD OF THE INVENTION

The present invention generally relates to noise prediction, and more particularly to a method for predicting output noise, such as simultaneous switching output (SSO) noise.

BACKGROUND OF THE INVENTION

The I/O interface of a typical integrated circuit (IC), such as a field programmable gate array (FPGA), may support or be configured to support a variety of I/O standards including such single-ended I/O standards as: low-voltage complementary metal oxide semiconductor (LVCMOS); low-voltage transistor-transistor logic (LVTTL); high-speed transceiver logic (HSTL); stub-series terminated logic (SSTL); gunning transceiver logic (GTL); and peripheral component interface (PCI). Differential I/O standards may also be supported by a typical FPGA, such as: low-voltage differential signaling (LVDS); LVDS extended; low-voltage, positive emitter coupled logic (LVPECL); bus LVDS (BLVDS); differential HSTL; stub-series terminated logic (SSTL); and hypertransport protocol (HT).

Furthermore, a typical application may implement many of the I/O standards listed above in a simultaneous fashion. For instance, an FPGA application may employ several I/O interfaces to support several I/O standards all at the same time. For example, one or more I/O banks of the FPGA may be used to implement a double data rate two (DDR2) synchronous dynamic random access memory (SDRAM) interface for high-speed data access using an SSTL I/O standard. One or more I/O banks of the FPGA may also be used to implement a flat-panel display driver interface using an LVDS I/O standard. In addition, one or more I/O banks of the FPGA may be used to implement a relatively low frequency control interface using an LVCMOS I/O standard.

As such, a high probability exists that simultaneously transitioning logic states of one or more output drivers of the FPGA will create power supply disturbances, which will affect the performance of other output drivers operating within the FPGA. Simultaneous switching events may also contribute to electromagnetic (EM) coupling disturbances, in which transient energy from a so-called "aggressor" signal path is electromagnetically coupled onto a so-called "victim" signal path. Both the power supply disturbances and the EM coupling disturbances combine to form simultaneous switching output (SSO) noise, which may result in undesirable behavior in the output drivers, input receivers, and internal logic of an IC.

Prediction of the time varying characteristics of SSO noise in any particular application is important, since SSO noise is a major factor leading to signal integrity corruption within silicon device packages, printed circuit boards (PCBs), signal transmission media, etc. Furthermore, the effects of SSO noise are exacerbated by noise margins that are continuously being decreased through reductions in the signal amplitude, as defined by the I/O standards.

Prediction of SSO noise, however, is extremely difficult in conventional FPGAs, as well as other integrated circuits, due to a number of factors. First, a large number of nodes are generally contributing to each SSO noise event, where each node makes its own unique contribution to each SSO noise event. In addition, the EM coupling characteristics of each node are non-uniform and complex due in large part to the 3-dimensional structures of conventional integrated circuits and device packages.

Conventional methods used to characterize SSO noise events have employed 3-dimensional modeling tools, such as HFSS™ from Ansoft Corp. Such 3-dimensional modeling tools, however, require high-performance computing platforms due to the computationally intensive algorithms that are executed by the 3-dimensional modeling tools. Even with the use of high-performance computing platforms, practical simulation runs must be limited to a relatively small number of electrical nodes due to the computational resources that are required.

Other SSO noise prediction methods attempt to approximate the electrical characteristics of the structures being simulated, so as to reduce the complexity of the computations required. Such methods, however, have received only limited success due to the lack of accuracy provided by the approximations. In particular, either the approximations completely disregard the actual electrical principles that contribute to the SSO noise events, or the electrical principles are not accurately represented when they are approximated.

Efforts continue, therefore, to simplify SSO noise prediction algorithms so as to reduce the complexity of the computing architectures that are required to execute the SSO noise prediction algorithms. Furthermore, efforts continue to improve the accuracy of the SSO noise prediction algorithms so as to increase the confidence level achieved when utilizing them.

SUMMARY

To overcome limitations in the prior art, and to overcome other limitations that will become apparent upon reading and understanding the present specification, various embodiments of the present invention disclose a method for predicting simultaneous switching output (SSO) noise using superposition and pre-recorded noise waveforms.

In accordance with one embodiment of the invention, a method of predicting output noise includes selecting a victim signal point and identifying one or more aggressor signals. For each aggressor signal identified, the aggressor signal is energized and electrical disturbances at the selected victim signal point are recorded in response to the energized aggressor signal. The method further includes aggregating the recorded electrical disturbances caused by a set of selected aggressor signals to predict the output noise at the selected victim signal point.

In accordance with another embodiment of the invention, an output noise prediction system includes a processor that is adapted to predict output noise effects within an integrated circuit. The processor performs functions including selecting a victim signal path within the integrated circuit, and identifying one or more aggressor signal paths within the integrated circuit. For each aggressor signal path identified, the aggressor signal path is energized and electrical disturbances at the selected victim signal path are recorded in response to the energized aggressor signal path. The processor performs functions further including aggregating the recorded electrical disturbances caused by a set of selected aggressor signal paths to predict the output noise at the selected victim signal path.

In accordance with another embodiment of the invention, an output noise prediction method includes storing a time series of voltage magnitude measurements taken at a plurality of victim signal points into a plurality of data files, where each data file is a result of electrical disturbances caused by an identified aggressor signal on an identified victim signal point. The output noise prediction method further includes identifying a victim signal point of interest where output noise is to be predicted, identifying one or more aggressor signals of interest that contribute to the output noise that is to be predicted, accessing the data files associated with each aggressor signal of interest, and summing the time series of voltage magnitude measurements in each accessed data file to predict output noise at the victim signal point of interest.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
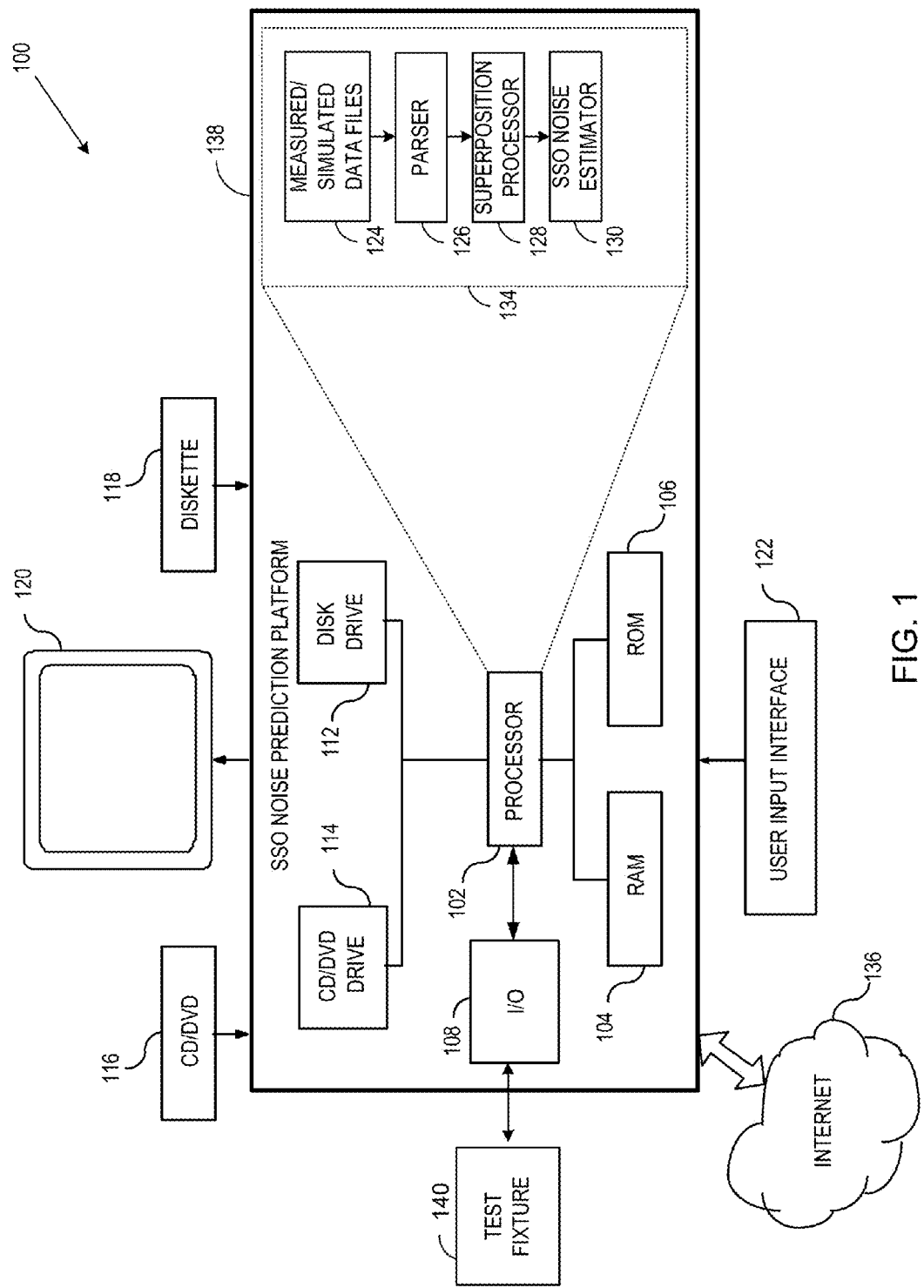
FIG. 1 illustrates an exemplary simultaneous switching output (SSO) noise prediction platform.

Generally, various embodiments of the present invention are applied to the prediction of output noise, such as simultaneous switching output (SSO) noise, that may be generated by one or more signal conduction paths within an electrical system. In particular, electrical disturbance waveforms are first recorded for each signal conduction path that may be affected by the electrical disturbances. Next, principles of superposition are utilized to coherently combine each of the electrical disturbance waveforms in the time domain to generate the predicted SSO noise waveform that is imposed upon the affected signal conduction path.

In particular, a signal conduction path of interest may be labeled as the so-called "victim" signal path, while the remaining signal paths that contribute to the SSO noise imposed upon the victim signal path are labeled as the so-called "aggressor" signal paths. It is noted that the aggressor signals may be analyzed at virtually any point in an electrical system where SSO noise may pose a problem. For example, the output signals of the output buffers of an integrated circuit, such as a field programmable gate array (FPGA), may be considered to be the aggressor signals for purposes of predicting SSO noise at a victim output pin of the FPGA. Similarly, any point along the transmitted signal path, e.g., signal traces implemented within the device package, printed circuit board (PCB), and transmission media, may also be considered to be a victim/aggressor signal path for purposes of predicting SSO noise.

The SSO noise prediction algorithm begins with the accumulation of aggressor-to-victim waveforms for each victim/aggressor signal pair. Each aggressor-to-victim waveform represents a compilation of voltage measurements of the voltage magnitude that is induced by a transitioning aggressor signal at the victim signal point.

That is to say, in other words, that the electrical disturbance induced by a first aggressor signal is measured by taking a time-based series of voltage magnitude measurements over a particular time period at a victim signal point. The electrical disturbance induced by a second aggressor signal is then measured by taking a time-based series of voltage magnitude measurements over the same time period at the same victim signal point. The process is repeated until voltage measurements representing the electrical disturbances induced by all aggressor signals have been taken at the victim signal point. Each time-based series of voltage measurements may then be coherently summed to provide the predicted SSO noise that is induced by all aggressor signals at the victim signal point.

In a first embodiment, the primary data is collected using bench measurements taken on an actual integrated circuit, device package, PCB, or transmission media. In such an instance, a device characterization platform is utilized to measure electrical disturbances caused by one or more aggressor signals at a first victim signal point. A second victim signal point is then selected and the device characterization platform is again utilized to measure electrical disturbances caused by one or more aggressor signals at the second victim signal point.

After measurements are taken for all aggressor/victim signal combinations, a 2-dimensional table of data is created, whereby the electrical disturbances caused by all aggressor signals for each victim signal point are tabulated. In particular, the electrical disturbances for each aggressor/victim signal pair are first tabulated into a 2-dimensional data file containing a time series of voltage magnitude measurements. Next, each 2-dimensional data file is tabulated within a 2-dimensional table that is arranged by aggressor/victim pair coordinates.

Should the predicted SSO noise for any victim signal point be required, then the electrical disturbance data caused by one or more of the aggressor signals for that victim signal point are retrieved from the 2-dimensional table of data. The electrical disturbance data for all retrieved aggressor signal entries are then coherently summed to provide the predicted SSO disturbance at the victim signal point by superposition. In alternate embodiments, the electrical disturbance data caused by one or more of the aggressor signals may be collected by simulation or by a combination of simulation and bench measurements.

Turning to FIG. 1, an SSO noise estimator is illustrated, which may be used to predict the time domain characteristics of SSO noise at any given victim point of a particular device under test. The exemplary SSO estimator includes SSO prediction platform 138, which includes a central processor (CPU) 102 that is coupled to random access memory (RAM) 104 and read-only memory (ROM) 106. The ROM 106 may also include other types of storage media, such as programmable ROM (PROM), electronically erasable PROM (EEPROM), etc., to store executable programs and utilities. The processor 102 may also communicate with other internal and external components, such as test fixture 140 via input/output (I/O) circuitry 108.

SSO prediction platform 138 may also include one or more data storage devices, including hard and floppy disk drives 112, CD/DVD drives 114, and other hardware capable of reading and/or storing information. Software for facilitating SSO noise estimates may be stored and distributed on a CD/DVD 116, diskette 118 or other forms of media capable of portably storing information. These storage media may be inserted into, and read by, devices such as CD/DVD drive 114, disk drive 112, etc.

The software for facilitating SSO noise estimates may also be transmitted to SSO prediction platform 138 via data signals that are downloaded electronically via a network such as Internet 136. SSO prediction platform 138 is coupled to a display 120, which may be any type of known display or presentation screen, such as an LCD display, plasma display, cathode ray tube (CRT), etc. A user input interface 122 is provided, which includes one or more user interface mechanisms such as a mouse, keyboard, microphone, touch pad, touch screen, voice-recognition system, etc.

Processor 102 may be adapted to iteratively execute SSO noise prediction tools 134 to aid in SSO noise estimate operations. Measured/simulated data files 124, for example, may either be generated using bench measurements taken by test fixture 140 or may be generated by processor 102 through simulated measurements. As discussed above, all measured or simulated data is taken on all aggressor/victim signal combinations and a 2-dimensional table of 2-dimensional data files is created, whereby the electrical disturbances induced by all aggressor signals for each victim signal point is tabulated within the 2-dimensional table of data.

Parser 126 receives the tabulated data files 124 and parses the tabulated data files depending upon which victim signal point and which aggressor signals are being analyzed. In particular, the victim signal point of interest may be identified by a user of SSO prediction platform 138, which has a corresponding set of one or more aggressor signal data files, which may also be identified by the user of SSO prediction platform 138. The victim/aggressor signal files are then pulled from the 2-dimensional table that contains the recorded electrical disturbances produced by the set of one or more aggressor signals on the victim signal of interest. Superposition processor 128 then retrieves the corresponding set of aggressor signal data files and performs the coherent summation of each time-based data point of each aggressor signal data file to form the superposition of each aggressor signal data file. SSO noise estimator 130 then retrieves the superposition and plots the predicted SSO noise for the victim signal point of interest.

It should be noted that test fixture 140 may contain an integrated circuit under test, such as an FPGA, as well as the control circuitry needed to exercise the FPGA during execution of a particular test vector. Test fixture 140 may exercise the FPGA under test via control signals from I/O 108 and processor 102 to energize the aggressor signals one at a time, where each aggressor signal may be generated by, e.g., an I/O buffer output signal. The aggressor signals are individually energized within the FPGA under test and the electrical disturbances caused at the victim signal point of interest by each individual aggressor signal may then be recorded. The process repeats until the electrical disturbances for all aggressor signals at all victim signal points of interest have been recorded and tabulated into 2-dimensional data files 124.

In one embodiment, victim data points of an FPGA under test may include the output pins of I/O buffers within the FPGA that are activated for operation. Each bank of I/O buffers of the FPGA may be activated, for example, to support I/O standards including such single-ended I/O standards as: low-voltage complementary metal oxide semiconductor (LVCMOS); low-voltage transistor-transistor logic (LVTTL); high-speed transceiver logic (HSTL); stub-series terminated logic (SSTL); gunning transceiver logic (GTL); and peripheral component interface (PCI). Differential I/O standards may also be supported by a typical FPGA, such as: low-voltage differential signaling (LVDS); LVDS extended; low-voltage positive emitter coupled logic (LVPECL); bus LVDS (BLVDS); differential HSTL; stub-series terminated logic (SSTL); and hypertransport protocol (HT).

Thus, while a first bank of I/O buffers within the FPGA may be configured for operation in conformance with the HSTL standard at a first data rate, for example, multiple other banks of I/O buffers within the FPGA may be configured for operation at varying data rates in conformance with other I/O standards, such as LVDS and LVCMOS. Thus, the logic state at a particular victim pin of an I/O buffer at any instant in time may be adversely affected by SSO noise caused by the simultaneous logic transitions at the aggressor pins of the remaining I/O buffers. Through operation of SSO prediction platform 138 of FIG. 1, therefore, an estimate of the logic perturbations at the victim output pin that are caused by the accumulated electrical disturbances of the remaining aggressor output pins may be generated, even if the various aggressor signal transitions are occurring at arbitrary times, as opposed to occurring simultaneously.

Figure 2:
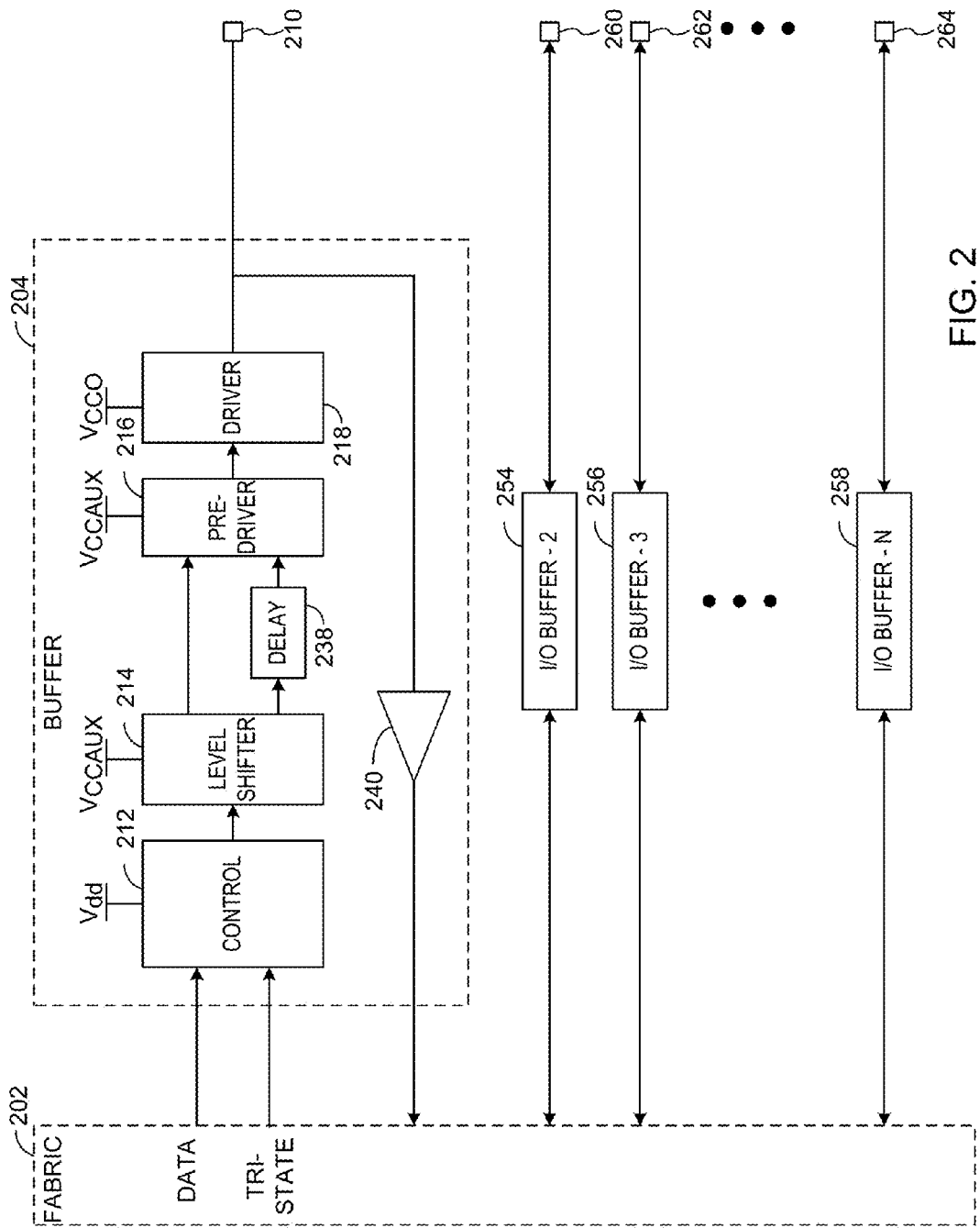
FIG. 2 illustrates a block diagram of the input/output (I/O) buffers of a typical integrated circuit (IC) such as a field programmable gate array (FPGA)

Turning to FIG. 2, a block diagram of the multiple I/O buffers of a typical FPGA is illustrated. In particular, the block diagram of FIG. 2 illustrates components of an FPGA based I/O buffer that may be configured to support the single-ended and differential I/O standards as discussed above. The output signal parameters that may be generated at output pads 210 and 260-264, therefore, include voltage out high ($V_{OH}$), voltage out low ($V_{OL}$), duty cycle, rise time, fall time, and other parameters as may be required by the particular I/O standard being implemented.

FPGA fabric 202 generates signal TRI-STATE, so as to enable, or disable, I/O buffers 204 and 254-258. Similarly, FPGA fabric 202 provides signal DATA to I/O buffers 204 and 254-258 that are enabled by signal TRI-STATE. It should be noted that while the I/O buffers of FIG. 2 are modeled as transmitting data signals from fabric 202 to output pads 210 and 260-264, input buffer 240 of each I/O buffer may be similarly configured to receive a signal from input pads 210 and 260-264, and in response, provide the received data signals to fabric 202.

Control block 212 operates at core voltage, e.g., $V_{dd}$, which is the same operational voltage magnitude that is utilized by fabric 202. Since pre-driver 216 and driver 218 operate at a relatively higher voltage magnitude, level shifter block 214 translates data and delayed data signals operating at the core voltage magnitude to data and delayed data signals operating at the I/O voltage magnitude. Delay block 238 may be utilized by each of I/O buffers 204 and 254-258 to adjust the timing of data transitions at output pads 210 and 260-264 relative to the timing of data transitions of the corresponding data signals provided by fabric 202.

Figure 3:
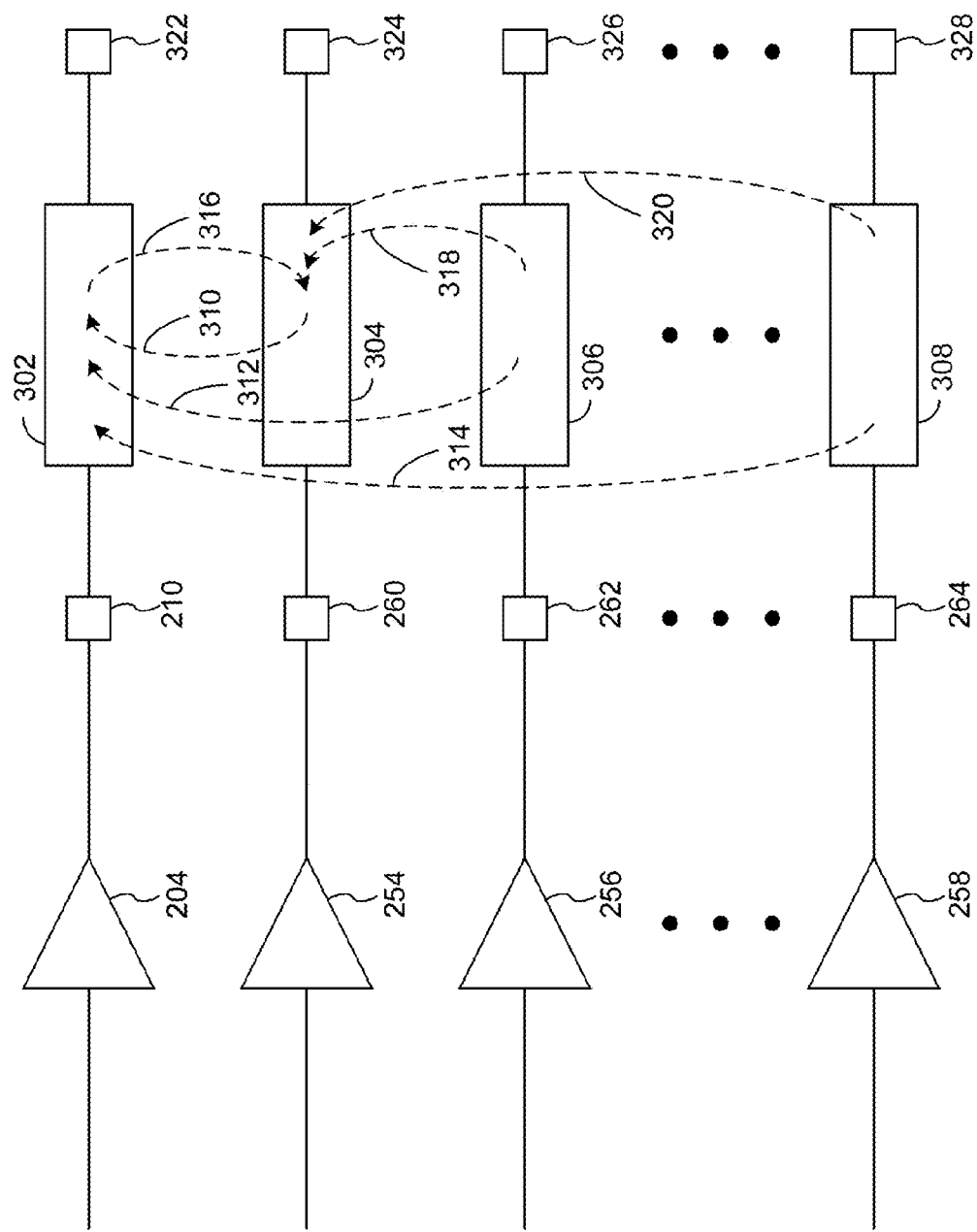
FIG. 3 illustrates a block diagram illustrating the SSO noise effects of one or more aggressor signal paths on a victim signal path.

Turning to FIG. 3, a block diagram illustrating the SSO noise effects of one or more aggressor signal paths on a victim signal path is exemplified. I/O buffers 204 and 254-258 may be activated/deactivated by fabric 202 as discussed above in relation to FIG. 2. Signal paths 302-308 denote the paths that are traversed by the I/O buffer output signals provided by I/O buffers 204 and 254-258 between output pads 210, 260-264 and data collection points 322-328, respectively. Thus, signal paths 302-308 may denote, for example, the signal traces implemented within the semiconductor package of the FPGA under test, the printed circuit board (PCB) to which the FPGA under test is mounted, and/or the transmission media that is used to propagate the I/O buffer output signals to data collection points 322-328.

During a first test sequence of the test vector exercised by test fixture 140, signal path 302 is denoted as victim signal path #1 and signal paths 304-308 are denoted as the aggressor signal paths. I/O buffers 256-258 are initially deactivated while a logic low to logic high data transition is caused to be executed by I/O buffer 254 and a steady-state logic high data value is caused to be maintained by I/O buffer 204. During the logic low to logic high data transition and for a sufficient amount of time afterward, test fixture 140 records the voltage magnitude present at victim signal point 322 so as to capture the effects of electrical disturbance 310 at victim signal point 322 that are caused by the logic low to logic high data transition of aggressor signal path 304. The recorded voltage magnitude data file, e.g., data file 1, is then placed into the [1,2] location of the 2-dimensional table that stores 2-dimensional data files 124 as illustrated in Table 1.

A logic high to logic low data transition is then caused to be executed by I/O buffer 254. During the logic high to logic low data transition and for a sufficient amount of time afterward, test fixture 140 records the voltage magnitude present at victim signal point 322 so as to capture the effects of electrical disturbance 310 at victim signal point 322 that are caused by the logic high to logic low data transition of aggressor signal path 304. The recorded voltage magnitude data file, e.g., data file 2, is then placed into the [1,2] location of the 2-dimensional table that stores 2-dimensional data files 124 as illustrated in Table 1.

TABLE 1

|  | Victim 302 | Victim 304 | Victim 306 | Victim 308 |
| --- | --- | --- | --- | --- |
| Aggressor 302 | Null | data file 7<br>data file 8 | data file 13<br>data file 14 | data file 19<br>data file 20 |
| Aggressor 304 | data file 1<br>data file 2 | Null | data file 15<br>data file 16 | data file 21<br>data file 22 |
| Aggressor 306 | data file 3<br>data file 4 | data file 9<br>data file 10 | Null | data file 23<br>data file 24 |
| Aggressor 308 | data file 5<br>data file 6 | data file 11<br>data file 12 | data file 17<br>data file 18 | Null |

During a second test sequence of the test vector exercised by test fixture 140, signal path 306 is deemed to be the active aggressor path and signal path 302 remains as the victim signal path. I/O buffers 254 and 258 are deactivated while a logic low to logic high data transition is caused to be executed by I/O buffer 256. During the logic low to logic high data transition and for a sufficient amount of time afterward, test fixture 140 records the voltage magnitude present at victim signal point 322 so as to capture the effects of electrical disturbance 312 at victim signal point 322 that are caused by the logic low to logic high data transition of aggressor signal path 306. The recorded voltage magnitude data file, e.g., data file 3, is then placed into the [1,3] location of the 2-dimensional table that stores 2-dimensional data files 124 as illustrated in Table 1.

A logic high to logic low data transition is then caused to be executed by I/O buffer 256. During the logic high to logic low data transition and for a sufficient amount of time afterward, test fixture 140 records the voltage magnitude present at victim signal point 322 so as to capture the effects of electrical disturbance 312 at victim signal point 322 that are caused by the logic high to logic low data transition of aggressor signal path 306. The recorded voltage magnitude data file, e.g., data file 4, is then placed into the [1,3] location of the 2-dimensional table that stores 2-dimensional data files 124 as illustrated in Table 1.

A third test sequence establishes signal path 308 as the active aggressor path, signal path 302 remains as the victim signal path, and I/O buffers 254-256 are deactivated. The logic transitions of I/O buffer 258 are caused to be executed by test fixture 140 and the recorded voltage magnitude data files, e.g., data file 5 and data file 6, capturing the effects of electrical disturbance 314 are placed into the [1,4] location of the 2-dimensional table that stores 2-dimensional data files 124 as illustrated in Table 1. As such, the effects of every aggressor signal path on victim signal path 302, as measured at victim signal point 322, are recorded in column "Victim 302" of Table 1.

Next, signal path 304 is deemed to be the victim signal path and signal paths 302 and 306-308 are deemed to be the aggressor signal paths. By energizing each aggressor signal path, the effects of electrical disturbances 316-320 may be similarly recorded in data files 7-12 and placed into the [2,1], [2,3], and [2,4] locations, respectively, of the 2-dimensional table that stores 2-dimensional data files 124 as illustrated in Table 1. Similar test sequences are then executed to record and store aggressor signal effects on victim signal paths 306-308 as discussed above.

Once 2-dimensional data files 124 are completely populated with aggressor data for each victim signal path, the effects of one or more of the aggressor signal paths on a victim signal path may be predicted by coherently summing each data entry of the appropriate aggressor signal data files of Table 1. For example, if the effects of aggressor signals in aggressor signal paths 304-308 on victim signal path 302 are required, then parser 126 may select data files 1-6. Superposition processor 128 may then coherently sum the appropriate time domain entries within data files 1-6 to calculate the aggregate effects of aggressor signal paths 304-308 on victim signal path 302 by superposition. SSO noise estimator 130 may then plot the superposition on display 120 for a graphical representation of the predicted SSO noise at victim signal point 322 as caused by aggressors signal paths 304-308.

As discussed in more detail below in relation to FIGS. 4 and 5, each entry in 2-dimensional data files 124 is a time-stamped voltage magnitude measurement that represents the effects of an electrical disturbance imposed at a victim signal point by a corresponding aggressor signal path over a given time period. In particular, multiple voltage magnitude measurements may be taken at fixed or varied time increments over the time period, whereby each voltage magnitude measurement is time stamped with the corresponding time increment that measures the elapsed time from a reference point in time, such as a reference clock trigger or the beginning of the electrical disturbance, to the actual time that the voltage magnitude measurement is taken.

Coherent summing of each entry of 2-dimensional data files 124 requires, therefore, that the voltage magnitude measurements that are summed together must have the same time stamp if no simulated time delay is to be imposed. As discussed in more detail below, however, a simulated time delay may be advantageously simulated by parser 126 by summing at least a portion of the voltage magnitude measurements that exhibit different time stamps. As such, virtually any simulated time delay may be imposed by summing voltage magnitude measurements having time stamps that differ by the amount of simulated time delay desired.

Figure 4:
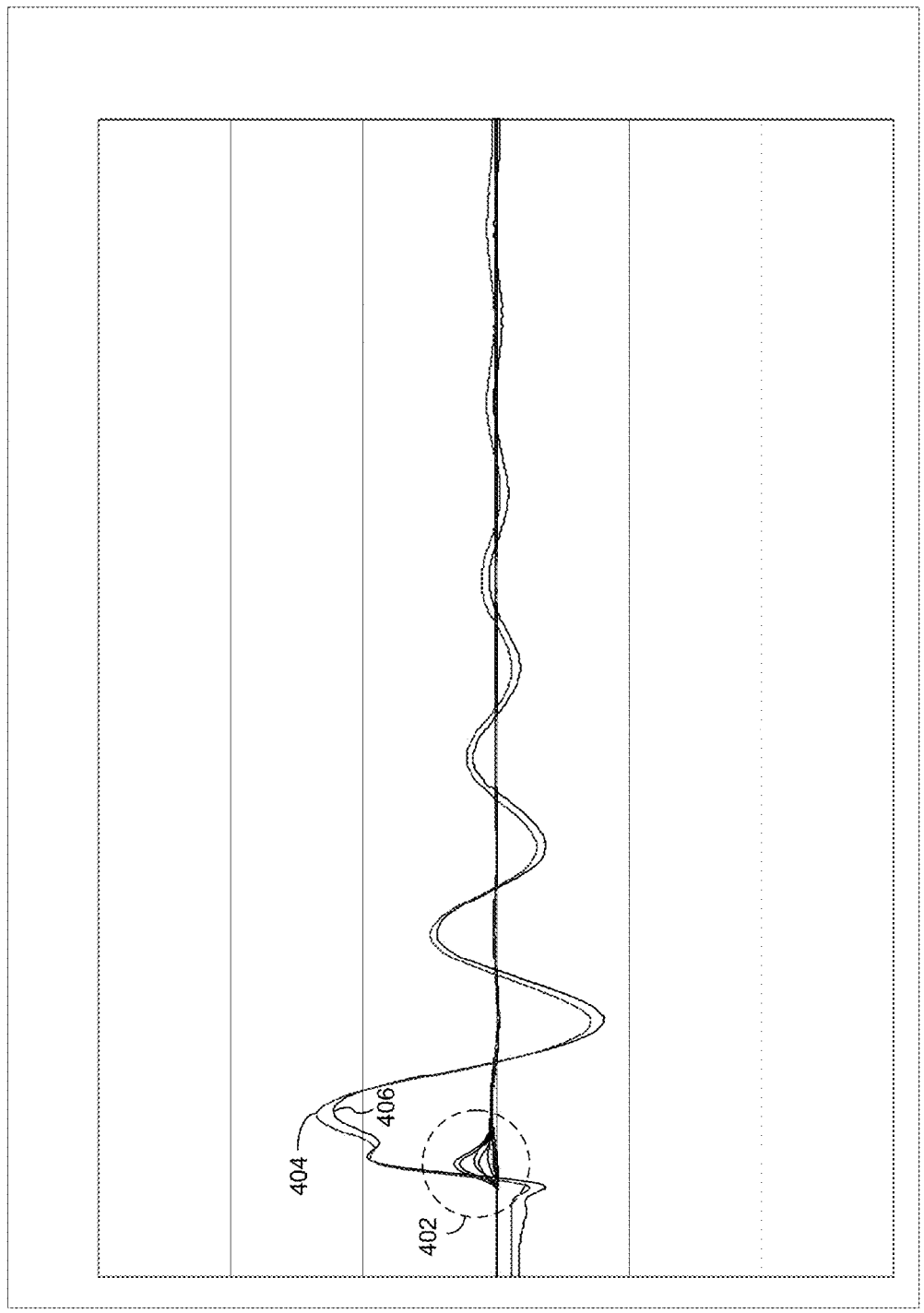
FIG. 4 illustrates an exemplary SSO noise prediction output of the SSO prediction platform of FIG. 1 in accordance with one embodiment of the present invention.

Turning to FIG. 4, various waveforms as may be plotted by SSO noise estimator 130 are illustrated. In particular, area 402 represents the initial voltage magnitudes, as recorded at a representative victim signal point, that are induced by a set of individual aggressor signals. Each signal within area 402, therefore, represents the initial electrical disturbance induced at the victim signal point by each individual aggressor signal as may be stored within data files similar to those discussed in relation to Table 1.

Waveform 406 represents the superposition of the electrical disturbances caused by each aggressor signal, which is the predicted SSO noise waveform that is imposed at the victim signal point of interest. For comparison, waveform 404 represents the electrical disturbance at the victim signal point of interest as actually measured when all aggressor signals are active. It can be seen, therefore, that predicted SSO noise waveform 406, as generated by the superposition of the individual aggressor signals that contribute to the total SSO noise, establishes a substantially accurate representation of actual SSO noise waveform 404 that is imposed upon a given victim signal path.

Figure 5:
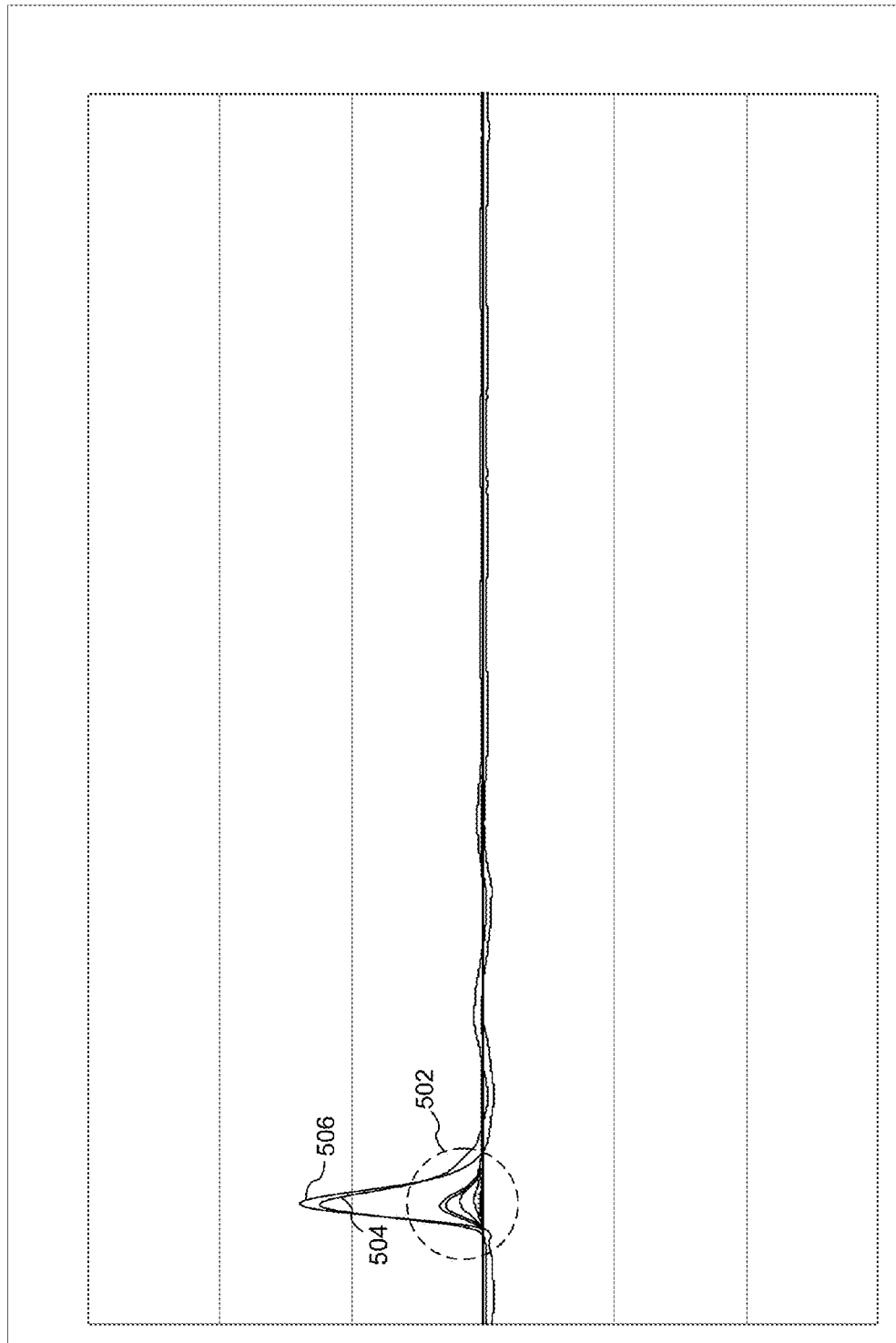
FIG. 5 illustrates an exemplary SSO noise prediction output of the SSO prediction platform of FIG. 1 in accordance with an alternate embodiment of the present invention.

Turning to FIG. 5, similar waveforms as may be plotted by SSO noise estimator 130 are illustrated. The waveforms of FIG. 5 differ from the waveforms of FIG. 4, in that the victim signal point of interest is caused to maintain a static logic zero output while the electrical disturbances caused by the aggressor signals are recorded. In particular, signals within area 502 represent the initial voltage magnitudes, as recorded at a representative victim signal point, that are induced by a set of individual aggressor signals. Each signal within area 502, therefore, represents the initial electrical disturbance induced at the victim signal point by each individual aggressor signal as may be stored within data files similar to those discussed in relation to Table 1. Waveform 506 represents the superposition of the electrical disturbances caused by each aggressor signal, which is the predicted SSO noise waveform that is imposed at the victim signal point of interest. For comparison, waveform 504 represents the electrical disturbance at the victim signal point of interest as actually measured when all aggressor signals are active.

The waveforms generated by SSO noise prediction platform 138 provide an analysis tool that allows designers to gain insight as to how SSO noise combines both constructively and destructively. In particular, should a designer wish to determine the effects of a particular set of aggressor signals on a particular victim signal, parser 126 may be programmed by the designer to include only those aggressor/victim signals of interest. Parser 126 then selects the requisite data from data files 124 that correspond to the victim and aggressor signals of interest so that the superposition of the selected aggressor signals may be computed by superposition processor 128. SSO noise estimator 130 may then graphically display the SSO noise predictions similar to the SSO noise predictions that are graphically illustrated by FIGS. 4 and 5.

The effects of timing variations on the SSO noise produced at a particular victim signal point of interest may also be characterized. As discussed above in relation to FIG. 2, for example, delay block 238 may be utilized by each of I/O buffers 204 and 254-258 to adjust the timing of data transitions at output pads 210 and 260-264 relative to the timing of data transitions of the corresponding data signals provided by fabric 202. Accordingly, the effects of such timing variations may be predicted through use of SSO noise prediction platform 138 by iteratively measuring/simulating data transitions having variable timing relationships, e.g., data transitions that exhibit non-simultaneous timing relationships, and then calculating/plotting the aggregate effect via superposition. Alternately, parser 126 may be utilized to offset the time-based entries in each of data files 124 by a known time duration, so as to simulate the effects of delay block 238 without actually having to exhaustively measure/characterize the effects of delay block 238.

In addition, SSO noise prediction in accordance with the present invention does not require an automatic assumption of worst case aggressor events in time. Instead, predicted SSO noise waveforms are generated by superposition of measured/simulated data. Thus, the predicted SSO noise waveforms inherently model the effects caused by, e.g., inductive power supply connections, electromagnetically coupled via crosstalk, and electromagnetically coupled trace-to-trace crosstalk.

Figure 6:
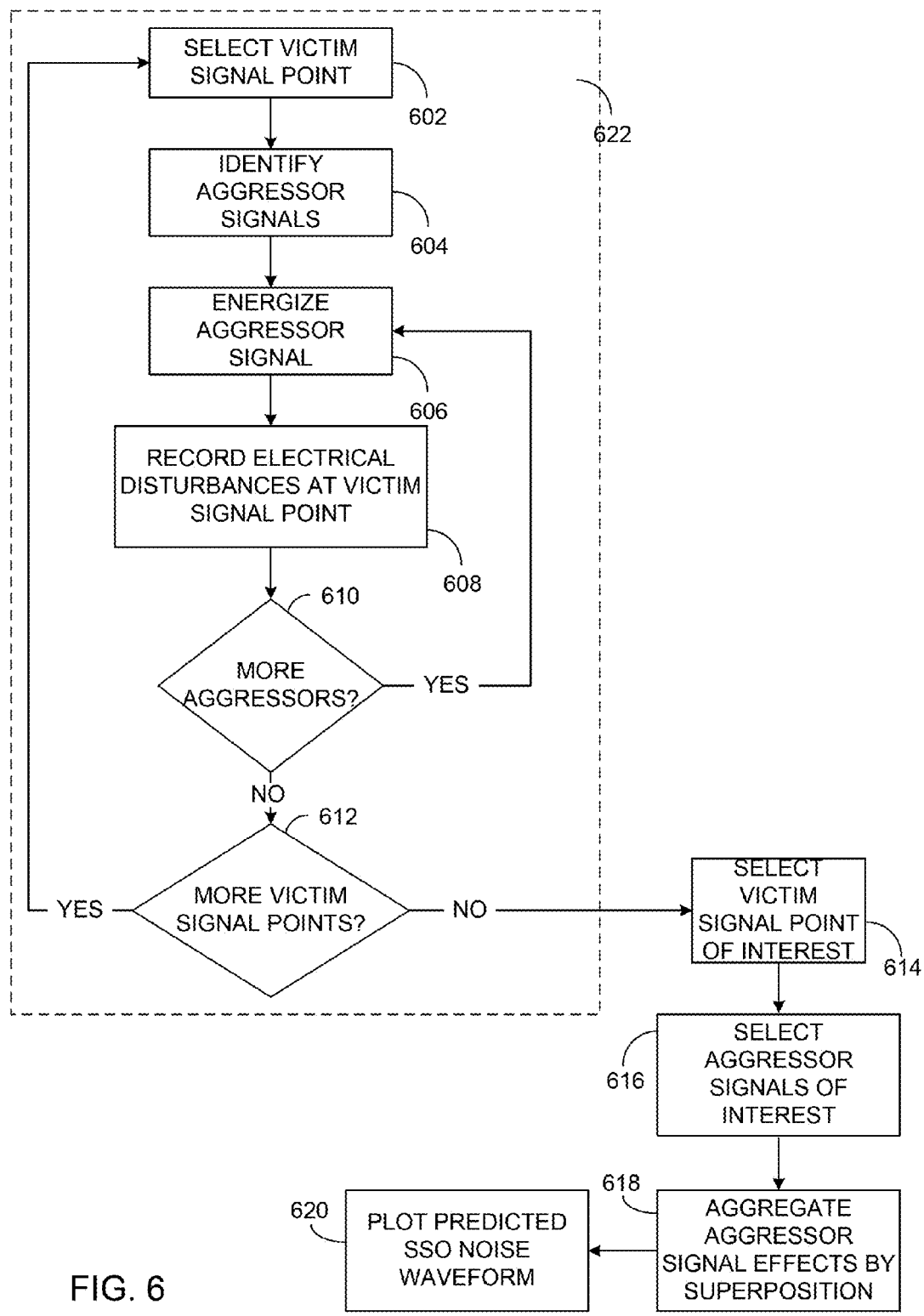
FIG. 6 illustrates an SSO noise prediction flow diagram in accordance with one embodiment of the present invention.

Turning to FIG. 6, an SSO noise prediction flow diagram in accordance with an embodiment of the present invention is exemplified. In step 602, a particular victim signal point is selected within the electrical system. In one embodiment, for example, victim data points of an IC under test may include the output pins/data paths of I/O buffers within the IC that are activated for operation as discussed above in relation to FIG. 2. In step 604, the aggressor signals are identified, which may include the remaining output pins/data paths that are not identified in step 602 as a victim signal point.

In step 606, a first aggressor signal is energized with a simulated, or bench generated, data transition and the electrical disturbances caused by the data transition are recorded at the victim signal point that was selected in step 602. The electrical disturbances are recorded in step 608 for a time duration that is effective to capture enough data so as to adequately represent the characteristics of the electrical disturbance. In one embodiment, for example, enough data is collected to allow the oscillations of the electrically induced disturbance at the victim signal point to dampen to within, e.g., 5-10% of the steady state value, as exemplified in FIGS. 4 and 5. Once recorded, the data is stored into a data file and placed within a 2-dimensional matrix as discussed above in relation to Table 1.

If more aggressor signals are to be energized, as determined in step 610, then execution steps 606-610 are repeated until all aggressor signals have been energized and all electrical disturbance recordings and associated data have been stored for the victim signal point selected in step 602. If more victim signal points are to be analyzed, then steps 602-612 are repeated until all aggressor signals have been energized and all electrical disturbance recordings and associated data have been stored for all victim signal points.

It is noted that the execution steps encompassed within block 622 are repeated during a first phase of operation, whereby data that is to be stored within the 2-dimensional matrix of Table 1 is generated. Once generated, execution steps 614 through 620 utilize the 2-dimensional matrix as a data repository in a second phase of operation to predict SSO noise at a plurality of victim signal paths as selected by the user.

Once all data files have been placed within the 2-dimensional matrix, the second phase of SSO prediction may commence. In particular, the victim signal point of interest is selected in step 614 and one or more aggressor signals of interest are selected in step 616. Parser 126 then selects the appropriate data files from the 2-dimensional matrix and superposition processor 128 aggregates the electrical disturbances caused by the aggressor signals selected in step 616 by superposition as in step 618. The predicted SSO waveform from superposition processor 128 may then be plotted by SSO noise estimator 130 as in step 620.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of predicting output noise, the method comprising:
   selecting a victim signal point;
   identifying one or more aggressor signals;

for each aggressor signal identified,
    energizing the aggressor signal; and
    recording electrical disturbance waveforms at the selected victim signal point in response to the energized aggressor signal; and
aggregating the recorded electrical disturbance waveforms caused by a set of selected aggressor signals to coherently combine the electrical disturbance waveforms to generate a predicted output noise at the selected victim signal point.

2. The method of claim 1, wherein selecting a victim signal point comprises identifying a signal path within an integrated circuit as the victim signal point.

3. The method of claim 2, wherein identifying the one or more aggressor signals comprises identifying one or more signal paths within the integrated circuit as the one or more aggressor signals.

4. The method of claim 1, wherein selecting a victim signal point comprises identifying a signal path within a printed circuit board as the victim signal point.

5. The method of claim 1, wherein aggregating the recorded electrical disturbance waveforms caused by a set of selected aggressor signals comprises generating a superposition of the individual aggressor signals.

6. The method of claim 1, wherein energizing the aggressor signal comprises switching a logic state of an electrical signal within a device under test.

7. The method of claim 1, wherein energizing the aggressor signal comprises simulating a switched logic state of an electrical signal within a device under test.

8. The method of claim 1, wherein recording electrical disturbance waveforms at the selected victim signal point in response to the energized aggressor signal comprises:
    measuring a plurality of voltage magnitudes at the selected victim signal point in response to the energized aggressor signal, wherein each of the plurality of measured voltage magnitudes is time-stamped; and
    storing the plurality of measured voltage magnitudes within a data file.

9. The method of claim 8, wherein aggregating the recorded electrical disturbance waveforms caused by each aggressor signal comprises:
    selecting a set of aggressor signals from the identified one or more aggressor signals;
    identifying data files that correspond to the selected set of aggressor signals;
    selecting voltage magnitude measurements from each identified data file; and
    summing the selected voltage magnitude measurements.

10. The method of claim 9, wherein summing the selected voltage magnitude measurements comprises summing measured voltage magnitudes having identical time stamps.

11. An output noise prediction system, comprising:
    a processor adapted to predict output noise effects within an integrated circuit by performing functions including:
        selecting a victim signal path within the integrated circuit;
        identifying one or more aggressor signal paths within the integrated circuit;
        for each aggressor signal path identified,
            energizing the aggressor signal path; and
            recording electrical disturbances at the selected victim signal path in response to the energized aggressor signal path; and
        aggregating the recorded electrical disturbances caused by a set of selected aggressor signal paths to predict the output noise at the selected victim signal path,
    wherein recording electrical disturbances at the selected victim signal path in response to the energized aggressor signal path comprises measuring a plurality of voltage magnitudes at the selected victim signal path in response to the energized aggressor signal path, wherein each of the plurality of measured voltage magnitudes is time-stamped; and storing the plurality of measured voltage magnitudes within a data file accessed by the processor.

12. The output noise prediction system of claim 11, wherein selecting a victim signal path comprises identifying a first input/output buffer signal path within the integrated circuit as the victim signal path.

13. The output noise prediction system of claim 12, wherein identifying the one or more aggressor signal paths comprises identifying one or more output buffers within the integrated circuit as the one or more aggressor signal paths.

14. The output noise prediction system of claim 13, wherein energizing the aggressor signal path comprises switching an output logic state of an output buffer of the one or more output buffers within the integrated circuit.

15. The output noise prediction system of claim 13, wherein energizing the aggressor signal comprises simulating a switched logic state of an output buffer of the one or more output buffers within the integrated circuit.

16. The output noise prediction system of claim 11, wherein recording electrical disturbances at the selected victim signal path in response to the energized aggressor signal path comprises:
    recording electrical disturbance waveforms.

17. The output noise prediction system of claim 11, wherein aggregating the recorded electrical disturbances caused by each aggressor signal path comprises:
    selecting a set of aggressor signal paths from the identified one or more aggressor signal paths;
    identifying data files that correspond to the selected set of aggressor signal paths;
    selecting a measured voltage magnitude from each identified data file;
    summing the selected voltage magnitude measurements; and
    wherein the selected voltage magnitudes include measured voltage magnitudes having identical time stamps.

18. An output noise prediction method, comprising:
    storing a time series of voltage magnitude measurements taken at a plurality of victim signal points into a plurality of data files, each data file being a result of electrical disturbances caused by an identified aggressor signal on an identified victim signal point;
    identifying a victim signal point of interest where output noise is to be predicted;
    identifying one or more aggressor signals of interest that contribute to the output noise that is to be predicted;
    accessing the data files associated with each aggressor signal of interest; and
    summing the time series of voltage magnitude measurements in each accessed data file to predict output noise at the victim signal point of interest,
    wherein summing the time series of voltage magnitude measurements in each accessed data file comprises locating voltage magnitude measurements within each accessed data file having equal time stamps; and summing the located voltage magnitude measurements to produce a time series of predicted output noise.

19. The output noise prediction method of claim 18, wherein
    locating voltage magnitude measurements within each accessed data file having equal time stamps
    comprises implementing a simulated delay by locating a voltage magnitude measurement having a time stamp that differs by the simulated delay.

* * * * *